(12) United States Patent
Benveniste

(10) Patent No.: US 6,442,373 B1
(45) Date of Patent: Aug. 27, 2002

(54) DISTRIBUTED COMPUTATION

(75) Inventor: Mathilde Benveniste, South Orange, NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/549,515

(22) Filed: Apr. 14, 2000

Related U.S. Application Data

(60) Provisional application No. 60/129,423, filed on Apr. 15, 1999.

(51) Int. Cl.$^7$ ................................................ H04B 17/00
(52) U.S. Cl. .................... 455/67.1; 455/423; 455/424; 455/454; 455/524; 709/201
(58) Field of Search ............................... 455/67.1, 423, 455/424, 454, 524; 709/201

(56) References Cited

U.S. PATENT DOCUMENTS

| | | | |
|---|---|---|---|
| 5,392,449 A | * 2/1995 | Shaughnessy et al. | ......... 455/8 |
| 6,078,569 A | * 6/2000 | Chandra | ...................... 370/330 |
| 6,202,082 B1 | * 3/2001 | Tomizawa et al. | .......... 709/201 |

OTHER PUBLICATIONS

Toward extending Adaptive Seft–Organizing Concurrent system Architecture. Andrew Bartczak. 1994International Symposium on Speech,Image processing and Neural Networks, Apr. 13–16, 1994, Hong Kong,IEEE 1994,p. 89–92.*
Parallel computing for RF Scattering Calculateions. Gary Bedrosian, John Dagelo, Andrew deBlois. IEEE Transactions on Magnetics, vol. 25, No. 4, Jul. 1989, p. 2884–2889.*

* cited by examiner

*Primary Examiner*—Lee Nguyen
*Assistant Examiner*—Danh C Le

(57) ABSTRACT

A method is disclosed for performing a distributed computation for RF Management in a wireless communications network. The computation involves a sequence of computation stages. The wireless network has a plurality of base stations, each base station contributing data the computation. Each base station engages in a respective stage of the distributed computation. The sequence in which the base stations are engaged in the computation, known as the "follower order", is specified in advance and is known to all the base stations. The method includes the step of beginning a first stage of the computation at a first base station in the specified sequence and performing each of the plurality of computation stages by a respective nth one of the plurality of base stations, the nth base station having access to a corresponding data set x(n). The method continues by computing a decision vector p(n) with the respective nth base station in a follower order, wherein the nth base station commences computation only after it receives a decision vector p(n−1) from an (n−1)th predecessor base station, the nth base station using the decision vector p(n−1) in its own computation of p(n). The last decision vector is sent from the last base station to the first base station, thereby completing the computation. The method concludes by broadcasting the last decision vector to all base stations. Safeguards are provided that enable the successful completion of the computation in case of node or communication failures.

9 Claims, 3 Drawing Sheets

DISTRIBUTED COMPUTATION

Benefit is hereby claimed under 37 CFR 1.78(4) to copending U.S. Provisional Application Serial No. 60/129,423 filed Apr. 15, 1999, entitled "Distributed Computation," by Mathilde Benveniste.

BACKGROUND OF THE INVENTION

1. Field of the Invention

This invention relates to distributed computations and more particularly relates to distributed computations for spectrum monitoring in wireless communications networks.

2. Related Art

The invention disclosed herein is related to copending U.S. Patent application Ser. No. 09/401,408, filed Sep. 22, 1999, entitled "Self-Configurable Wireless Systems: Spectrum Monitoring In A Layered Configuration," by Mathilde Benveniste, assigned to AT&T Corporation and incorporated herein by reference.

SUMMARY OF THE INVENTION

A method is disclosed for performing a distributed computation for RF Management in a wireless communications network. The computation involves a sequence of computation stages. The wireless network has a plurality of base stations, each base station contributing data the computation. Each base station engages in a respective stage of the distributed computation. The sequence in which the base stations are engaged in the computation, known as the "follower order", is specified in advance and is known to all the base stations. The method includes the step of beginning a first stage of the computation at a first base station in the specified sequence and performing each of the plurality of computation stages by a respective nth one of the plurality of base stations, the nth base station having access to a corresponding data set $x(n)$. The method continues by computing a decision vector $p(n)$ with the respective nth base station in a follower order, wherein the nth base station commences computation only after it receives a decision vector $p(n-1)$ from an $(n-1)$th predecessor base station, the nth base station using the decision vector $p(n-1)$ in its own computation of $p(n)$. The last decision vector is sent from the last base station to the first base station, thereby completing the computation. The method concludes by broadcasting the last decision vector to all base stations. Safeguards are provided that enable the successful completion of the computation in case of node or communication failures.

DESCRIPTION OF THE PREFERRED EMBODIMENT

Figure 1:
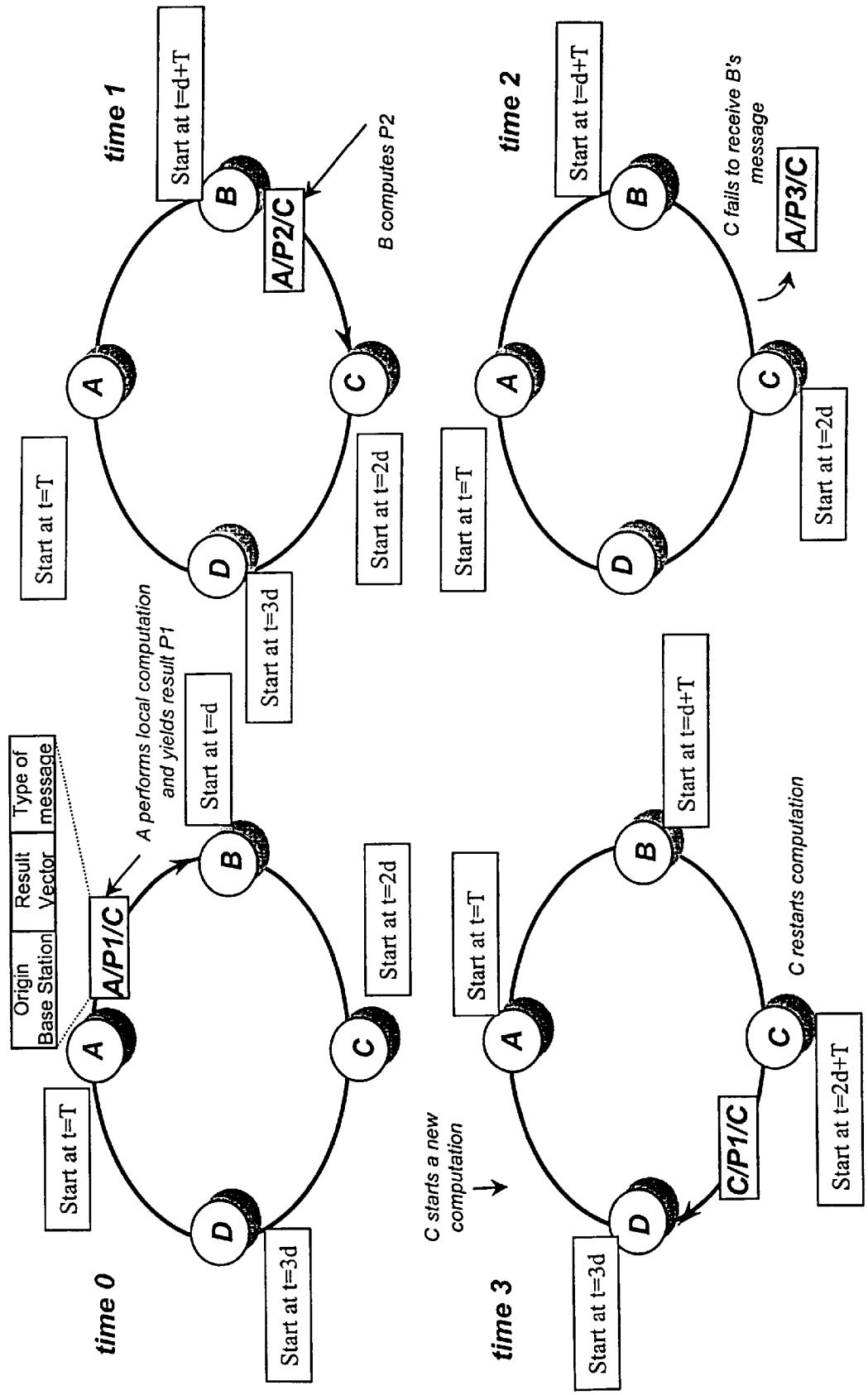
FIG. 1 shows a four node network of distributed data processors or wireless base stations, depicted at four sequential stages of time 0, 1, 2, and 3, functioning in accordance with the invention.

The invention is directed to decomposing computations in a way that yields the same result as when the computation is executed centrally. A computation is viewed as a mapping of a collection of unknown parameters onto a set of decision variables. Computations that are amenable to such decomposition are those reducible to a sequential execution of n distinct stages, each involving subsets of the unknown parameters. These subsets of parameters may overlap. The different stages are linked by a recursive relationship that computes a vector of decision variables at each stage. Let:

$x(n)$ be the vector of unknown parameters involved in stage n;

$p(n)$ be the decision variable vector obtained by the computation in stage n;

For such computations recursive formula like the following applies.

$$p(n)=g[x(n), p(n-1)] \qquad (1)$$

All computations that are separable as described above can be distributed without variation in the outcome.

One example of separable computations is the computation of a minimum or a maximum. We wish to compute the maximum/minimum of a function over N non-overlapping sets of non-negative variables $s(n)$. Let M=max (over n) [max $s(n)$]. If we define $p(n)$ to be the maximum over the first n sets, and $x(n)$ to be the maximum over the variables in set $s(n)$ and we define the function g as $g[x(1), x(2)]$=max$[x(1), x(2)]$, and $(0)=0$ then, the recursive relationship in (1) applies since for all n greater than or equal to 1

$$p(n)=g[x(n), p(n-1)]=\max[x(n), \max[x(n-1), p(n-2)]]=\ldots=\max[x(n), x(n-1), \ldots, x(1)]$$

An example of a separable maximum computation for RF management in a wireless network is discussed at length below.

Another example of separable binary computations is the process of establishing reservations for a limited resource, made by a plurality of requesters of that resource. One example of this is a plurality of agents selling tickets for seats in a theater. As each agent sells a ticket for a seat, the binary information that the seat is no longer available must be distributed to all other agents, to avoid over-booking the seats. The availability of a particular seat is indicated by a binary scalar which set equal to 1 if the seat is available, and 0 if not. Each agent thus maintains a vector of binary variables corresponding to the block of seats she/he has permission to sell. Thus, if the ticket agent wants to sell thirty seats, the agent's reservation information, which can be expressed as a vector containing thirty 0 elements, must be distributed to all other agents, to avoid over-booking the block of seats.

Sequential Computation Procedure

In accordance with the invention, each computation stage is carried out by a different computation node, n, which has access to the corresponding variable set, $x(n)$. Each node computes the decision vector, $p(n)$. The nodes execute their computations in, what we call, the follower order. A node will commence computation only after it receives the decision vector of its predecessor, which it uses in its own computation.

The nodes in our example are the base stations. Each base station has access only to a subset of variables. The first node starts the computation at a preset time. The follower node will commence its computation only once it receives the decision vector from its predecessor. The last node in the sequence sends its decision vector to the first node. This competes the computation. Once a computation is completed, it is broadcast to all nodes. Any broadcast mechanism may be applied.

Resiliency of Computation

Node or communication failures can stop the computation. We prevent computation failure as follows. Once the computation has started, acknowledgement of receipt of the decision vector protects against communication or node failure along the computation path. If there is a failure on a link or at the node at the head of a link, the sender by-passes its follower by sending the decision vector to the controller to investigate the failure. All nodes are notified to remove the node at the head of the failed link from the collection of nodes.

A computation may never get started if the starting node fails. Alternatively, a computation may start, but it may not complete if a node fails after acknowledgement has been sent to the predecessor node but before the node forwards its results to its follower. The generation of replicates of the same computation, staggered in time, protects against such failures. Computation replicates are scheduled to start at different nodes at increasing times, referred to as computation start times. When a node receives a decision vector from its predecessor, its computation start time is postponed by adding an increment T to its start time. When a node receives a broadcast message with the final results, notifying it that the computation is complete, its start timer is canceled [e.g. the start time is set to a large number].

Spectrum Monitoring Example

The following example is taken from an application in wireless communications. An overlay arrangement is considered, whereby two wireless communication systems share the same RF spectrum. One of the systems, the primary system, uses the spectrum as if the other is not present. The second system, the adjunct system, monitors the activity of the first and makes its RF spectrum-use decisions accordingly. The adjunct system engages in spectrum monitoring in order to determine whether an RF channel is used by the primary system. It combines signal strength measurements taken by the system base stations to determine whether any of the measurements exceeds a specified threshold level. This computation is equivalent to calculating the maximum signal strength measurement among all base stations and comparing to the threshold value. The distributed control mechanism presented herein is employed for the calculation of the maximum signal strength measurement on a given RF channel. Each base station contributes its own measurement to the calculation of the maximum and passes on the revised maximum to it follower base station. When the computation is complete, it is broadcast to all base stations. Examples of base stations and wireless networks are disclosed in U.S. Pat. No. 5,404,574 to Mathilde Benveniste, entitled "Apparatus And Method For Non-Regular Channel Assignment In Wireless Communication Systems" and in U.S. Pat. No. 5,787,352 to Mathilde Benveniste, entitled "System and method for management of neighbor-channel interference with power control and directed channel assignment", both patents being assigned to the AT&T Corporation, and incorporated herein by reference.

Algorithm Logic

FIG. 1 shows a four node network of distributed data processors or wireless base stations, depicted at four sequential stages of time 0, 1, 2, and 3, functioning in accordance with the invention. Each base station has a time at which it is expected to start the computation. The starting time is staggered. That is, the starting time for the nth base station on the broadcast order will be initially set at: $(n-1)*d$. The value of d is of the order of the maximum travel time between two nodes, such as A and B.

At its computation starting time a base station starts a computation replicate and passes the result on to its follower in a message Type C. Type C messages carry the decision vector containing the results of the computation completed at the node and the computation replicate identification which the same as the identification of the originator node When a base station receives a Type C message it contributes to the computation and forwards the result to its follower.

When a base station sends a Type C message to its follower it updates its computation start time by increasing it by T; that is, $t=t+T$. The value of T is larger than the value of d, and is of the order of the time required for a message to traverse all of the nodes A, B, C, and D and to return to node A.

When a base station receives a Type C message with computation replicate identification the same as its own, it generates a type B message with the final result, which is broadcast to all other base stations. Type B messages carry the final result of the computation.

Figure 2:
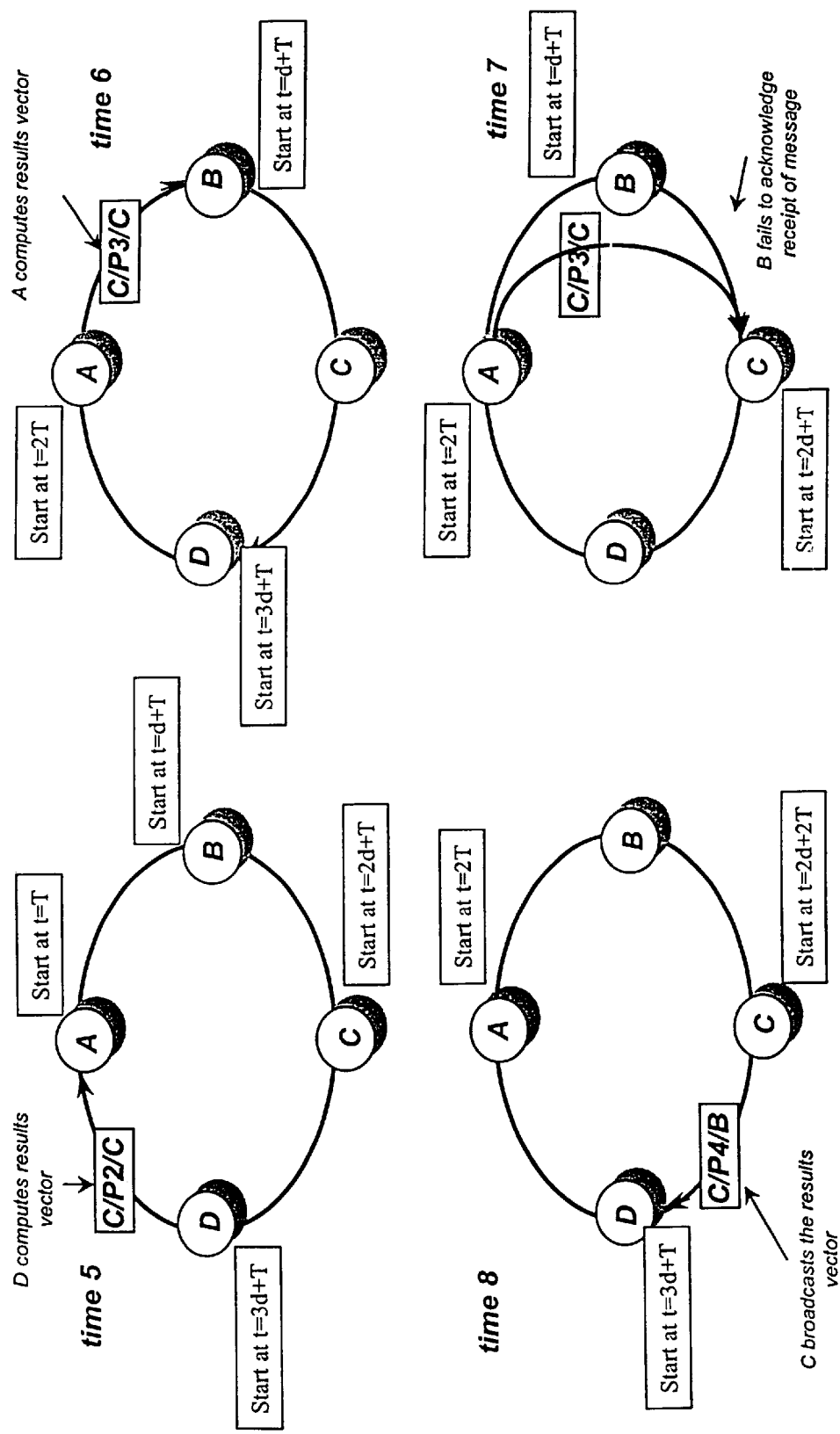
FIG. 2 shows the four node network of FIG. 1, depicted at four sequential stages of time 5, 6, 7, and 8, functioning in accordance with the invention.

Broadcast of a Type B message may take many forms. One broadcasting method would be for the base station initiating the broadcast to send the message to its follower. When a base station receives a Type B message it forwards it to its follower. FIG. 2 shows the four node network of FIG. 1, depicted at four sequential stages of time 5, 6, 7, and 8, functioning in accordance with the invention. The Type B message is generated by node C at time 8.

Figure 3:
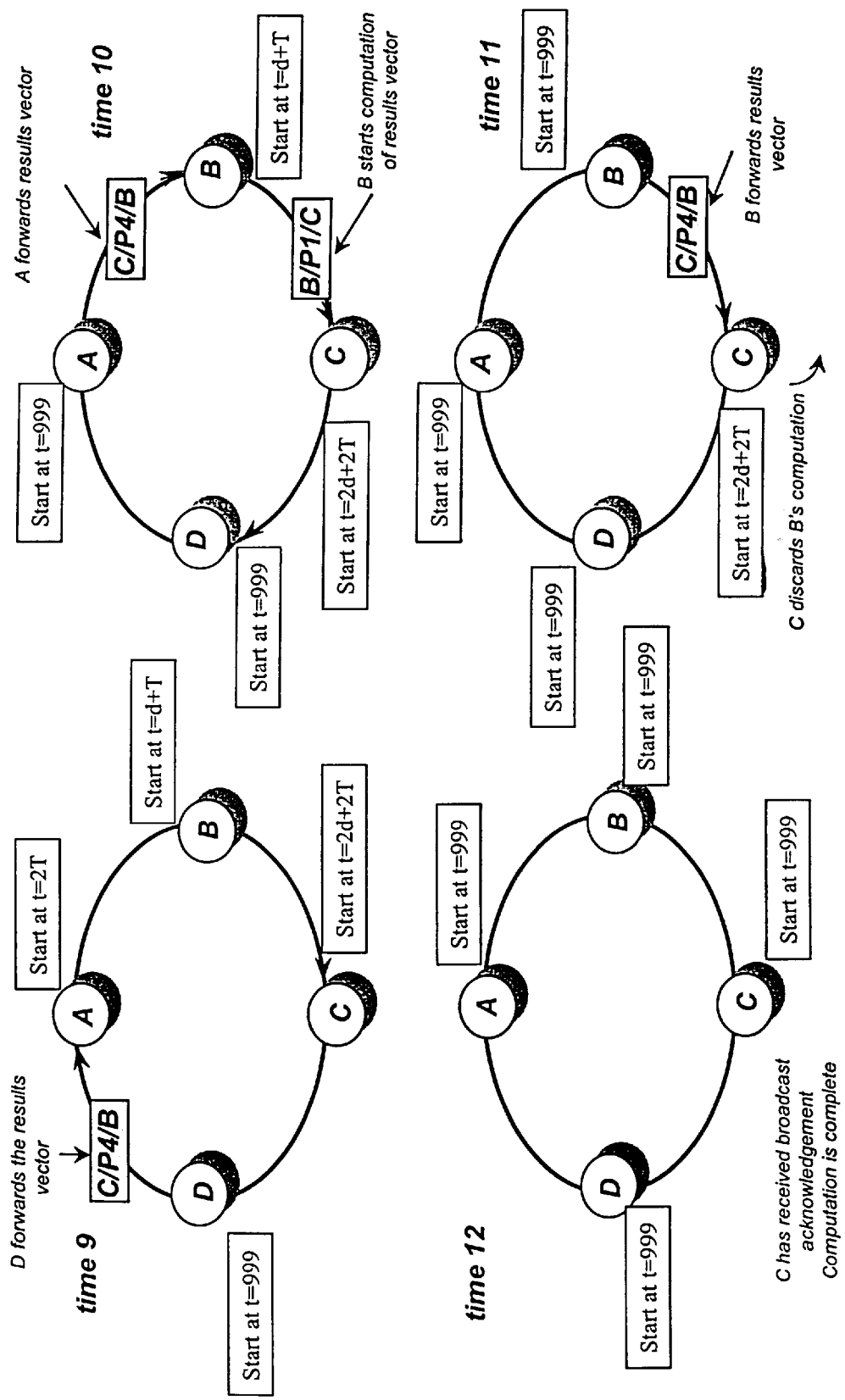
FIG. 3 shows the four node network of FIGS. 1 and 2, depicted at four sequential stages of time 9, 10, 11, and 12, functioning in accordance with the invention.

When a base station receives a Type B message, it sets its start time to 999. FIG. 3 shows the four node network of FIGS. 1 and 2, depicted at four sequential stages of time 9, 10, 11, and 12, functioning in accordance with the invention. Node D sets its start time to 999 at time 9. When a base station receives a type B message it originated, the computation is complete.

Various illustrative examples of the invention have been described in detail. In addition, however, many modifications and changes can be made to these examples without departing from the nature and spirit of the invention.

What is claimed is:

1. A method for performing a distributed computation having a plurality of computational stages, among a plurality of data processors in a distributed processing network, comprising:

beginning a first stage of the plurality of computation stages at a first data processor of the plurality of data processors;

performing each of the plurality of computation stages by a respective nth one of the plurality of data processors, said nth processor which having access to a corresponding variable set $x(n)$;

computing a decision vector $p(n)$ respectively with said nth data processor in a follower order, wherein the nth data processor commences computation only after it receives a decision vector $p(n-1)$ from an $(n-1)$th predecessor data processor, said nth data processor using said decision vector $p(n-1)$ in its own computation of $p(n)$;

sending a last decision vector from a last data processor of the plurality of data processors to the first data processor; and broadcasting the result of the computation by the first data processor to all other data processors, thereby completing the computation.

2. A method for performing a distributed computation of claim 1, which further comprises:

by-passing the (n+1)th follower data processor in the event successful receipt acknowledgement is not received, and sending the decision vector p(n) to the (n+2)th data processor, said (n+2)th data processor using said decision vector p(n) in its own computation of p(n+2); and notifying all data processors of said acknowledgement failure.

3. A method for performing a distributed computation of claim 1, which further comprises:

starting a timer at the nth data processor upon expiration of which the data processor will initiate the computation replicate and assigning it the initial expiration time t(n), which increases with n;

incrementing the timer expiration time t(n) when a decision vector p(n) has been computed; and cancelling the timer when a final result has been received.

4. A method for performing a distributed computation for RF Management in a wireless communications network, the computation having a plurality of computational stages, the network having a plurality of base stations, each base station contributing data for a respective stage the distributed computation, comprising:

beginning a first stage of the plurality of computation stages at a first base station of the plurality of base stations;

performing each of the plurality of computation stages by a respective nth one of the plurality of base stations, said nth base station having access to a corresponding data set x(n);

computing a decision vector p(n) respectively with said nth base station in a follower order, wherein the nth base station commences computation only after it receives a decision vector p(n−1) from an (n−1)th predecessor base station, said nth base station using said decision vector p(n−1) in its own computation of p(n);

sending a last decision vector from a last base station of the plurality of base stations to the first base station, and broadcasting the result of the computation by the first base station to all other base stations, thereby completing the computation.

5. A method for performing a distributed computation of claim 4, which further comprises:

by-passing the (n+1)th follower base station in the event successful receipt acknowledgement is not received, and sending the decision vector p(n) to the (n+2)th data processor, said (n+2)th base station using said decision vector p(n) in its own computation of p(n+2); and notifying all base stations of said acknowledgement failure.

6. A method for performing a distributed computation of claim 4, which further comprises:

starting a timer at the nth base station upon expiration of which the base station will initiate the computation replicate and assigning it the initial expiration time t(n), which increases with n;

incrementing the timer expiration time t(n) when a decision vector p(n) has been computed; and cancelling the timer when a final result has been received.

7. A method for performing a distributed computation for spectrum monitoring in a wireless communications network, the computation having a plurality of computational stages, the network having a plurality of base stations, each base station contributing spectral data for a respective stage the distributed computation, comprising:

beginning a first stage of the plurality of computation stages at a first base station of the plurality of base stations;

performing each of the plurality of computation stages by a respective nth one of the plurality of base stations, said nth base station having access to a corresponding spectral data set x(n);

computing a decision vector p(n) respectively with said nth base station in a follower order, wherein the nth base station commences computation only after it receives a decision vector p(n−1) from an (n−1)th predecessor base station, said nth base station using said decision vector p(n−1) in its own computation of p(n);

sending a last decision vector from a last base station of the plurality of base stations to the first base station, thereby completing the computation; and broadcasting the result of the computation by the first base station to all other base stations, thereby completing the computation.

8. A method for performing a distributed computation of claim 7, which further comprises:

by-passing the (n+1)th follower base station in the event successful receipt acknowledgement is not received, and sending the decision vector p(n) to the (n+2)th data processor, said (n+2)th base station using said decision vector p(n) in its own computation of p(n+2); and notifying all base stations of said acknowledgement failure.

9. A method for performing a distributed computation of claim 7, which further comprises:

starting a timer at the nth base station upon expiration of which the base station will initiate the computation replicate and assigning it the initial expiration time t(n), which increases with n;

incrementing the timer expiration time t(n) when a decision vector p(n) has been computed; and cancelling the timer when a final result has been received.

* * * * *